(12) United States Patent
Davis

(10) Patent No.: US 6,857,831 B2
(45) Date of Patent: Feb. 22, 2005

(54) I-JOIST HOLE CUTTING APPARATUS

(76) Inventor: John D. Davis, 7633 Raven Hills Dr., Las Vegas, NV (US) 89149

(\*) Notice: Subject to any disclaimer, the term of this patent is extended or adjusted under 35 U.S.C. 154(b) by 0 days.

(21) Appl. No.: 10/788,669

(22) Filed: Feb. 27, 2004

(65) Prior Publication Data

US 2004/0213640 A1 Oct. 28, 2004

Related U.S. Application Data

(60) Provisional application No. 60/451,225, filed on Feb. 28, 2003.

(51) Int. Cl.⁷ ............................................... B23B 51/04
(52) U.S. Cl. ........................................ 408/206; 408/204
(58) Field of Search ............................... 408/204, 206, 408/207, 209, 703, 713

(56) References Cited

U.S. PATENT DOCUMENTS

| | | | | |
|---|---|---|---|---|
| 351,059 A | \* | 10/1886 | Maloy | 408/206 |
| 1,669,273 A | \* | 5/1928 | Wojhowski et al. | 408/86 |
| 4,090,804 A | | 5/1978 | Haley | 408/59 |
| 4,239,427 A | \* | 12/1980 | Walton, II | 408/213 |
| 4,295,763 A | | 10/1981 | Cunniff | 408/86 |
| 4,669,928 A | | 6/1987 | Mediavilla | 408/68 |
| 5,451,126 A | | 9/1995 | Brun | 408/1 R |
| 5,597,274 A | | 1/1997 | Behner | 408/204 |
| 5,651,646 A | | 7/1997 | Banke et al. | 408/204 |
| 5,931,614 A | \* | 8/1999 | Meyen et al. | 408/201 |
| 6,007,279 A | \* | 12/1999 | Malone, Jr. | 408/204 |
| 6,015,248 A | | 1/2000 | Elliott et al. | 408/204 |
| 6,099,214 A | | 8/2000 | Lee et al. | 408/204 |
| 6,152,661 A | | 11/2000 | Thrasher | 408/204 |

\* cited by examiner

Primary Examiner—Daniel W. Howell
Assistant Examiner—Ali Abdelwahed
(74) Attorney, Agent, or Firm—Johannes Schneeberger

(57) ABSTRACT

A hole saw for cutting standardized holes in the web portion of an I-joist features a light weight three spoke body having a rim with continuous circumference and three inserted cutting blades fixed in an offset to the circumference, which is dimensioned in accordance to standard web heights.

12 Claims, 5 Drawing Sheets

I-JOIST HOLE CUTTING APPARATUS

PRIORITY CLAIM

The present invention claims priority to the U.S. Provisional Application Ser. No. 60/451,225 filed Feb. 28, 2003, which is hereby incorporated by reference.

FIELD OF INVENTION

The present invention relates to hole saws. Particularly, the present invention relates to hole saws for cutting holes in a in corner regions with spacing requirements such as a web portion of an I-joist.

BACKGROUND OF INVENTION

I-joists are increasingly utilized structural elements in architectural constructions and the like. I-joists are beams that have an I like profile to provide maximum stiffness and strength with a minimum of weight. I-joists are commonly fabricated in a number of dimensional standards from wood and wood like materials.

Architectural constructions often require the cutting of holes into the web portion of the I-joist to lay pipes, electrical lines and the like across one or more installed I-joist. There exist a number of standards for maximum hole sizes that may be cut into the web portion. Of primary concern is thereby a remaining offset between the web hole and the horizontal top and bottom portion of the I-joist in order to keep the I-joists buckling tendency within safe limits. Therefore there exists a need for a hole cutting apparatus that provides spacing between adjacent sticking out structures while cutting the hole. The present invention addresses this need.

The cutting of large diameter holes at the construction site is mainly accomplished by hand held power tools in which the cutting apparatus is rotatable held. Therefore, for cutting large diameter holes there exists also a need for a cutting apparatus that provides cutting action with minimum friction, reduced peak torque and safe operation without pronounced or sharp features extending beyond the circumference of the rotating apparatus. The present invention addresses also these needs.

SUMMARY

Cutting holes with a hand held power drill or the like may be accomplished in combination with a hole cutting apparatus concentrically attached to a rotating portion of the power drill. As the hole diameter increases, the resulting torque increases as well. A hole cutting apparatus in accordance with the preferred embodiment of the invention has a number of circumferentially arrayed cutting members configured to keep cutting forces and a resulting cutting torque to a minimum for a given cutting diameter, given axial cutting pressure and a given material of the work piece.

The hole cutting apparatus has a lightweight body including radial beams that connect a central portion with a circumferential ring. Concentrically attached to the central portion is on one side an arbor for attaching the apparatus to the power drill or the like. A pilot drill is attached on the opposite side in coaxial alignment with the arbor. The pilot drill drills a pilot hole into the work piece such that the apparatus is centered during the following hole cutting. The pilot drill extends sufficiently beyond the cutting members to drill the pilot hole sufficiently deep before the cutting members contact the work piece. As the rotating apparatus is forced towards the work piece, cutting edges of the cutting members gradually remove material along an increasingly deep concentric groove until a portion of the work piece inside the concentric groove becomes separated from the remaining work piece.

In the preferred embodiment, the apparatus is configured in combination with dimensional standards of an I-joist. With respect to the present invention, an I-joist is defined as an I-beam profile having a top chord, a bottom chord and a central web portion. The apparatus provides a cutting of holes in the web portion in accordance with dimensional safety criteria for maximum hole dimensions in the web. The safety criteria are established by I-joist manufacturers for their respective products. Particularly, the ring portion of the apparatus has an outer diameter that corresponds to a height of the web portion between the chord elements such that the apparatus becomes aligned between the top chord and the bottom chord prior to a contacting of the pilot drill with the web portion. The cutting members are in an offset to the ring diameter such that the cutting groove and consequently the hole edge remain in a certain distance to the chords in accordance with the safety criteria.

In the preferred embodiment, three cutting members are circumferentially arrayed to provide an even distribution of cutting pressure onto the individual cutting members. For an I-joist made of wood and/or wood like material, the cutting members may be made of steel, carbide or other material suitable for cutting wood and/or wood like material. The cutting members are preferably mounted in an exchangeable fashion for easy replacement.

DETAILED DESCRIPTION

Figure 1:
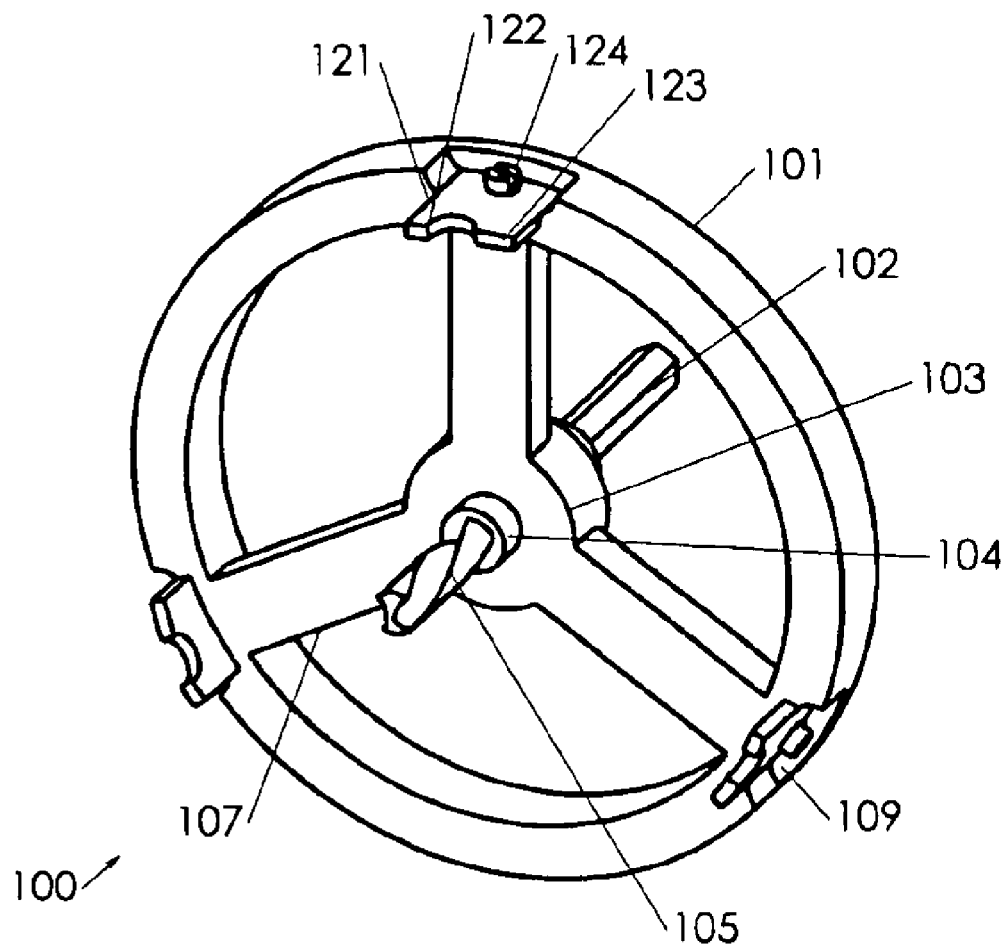
FIG. 1 shows a perspective view of a first embodiment of the invention.

Referring to FIG. 1, the present invention is a hole cutting apparatus 100 configured to be attached to a rotating portion of a well known power drill. The power drill may be substituted by other well-known devices configured for receiving and rotating other well known apparatus performing rotating operations. The apparatus 100 is axially attached via an arbor 102, which may have a hexagonal shape for a rigid interlocking with a three jaw-clamping device of the power drill. The arbor 102 may have other configurations as are well known in the art for transmitting a torque while keeping the apparatus 100 aligned with respect to its rotation axis.

The arbor 102 extends from the backside of a central portion 103 from which preferably three beams or spokes 107 extend in radial direction. The radial beams or spokes 107 connect the central portion 103 with a circumferential ring or rim 101. The spokes 107 provide a stiff connection between the rim 101 and the central portion 103 while keeping the over all weight of the apparatus 100 to a minimum.

From the front side of the central portion 103 extends a pilot drill 105, which is in axial alignment with the arbor 102. An optional spacer 104 may provide a safety space between the pilot drill 105 and the central portion 103 to prevent an inadvertent contacting of the central portion 103 and/or the spokes 107 and/or the rim 101 with a work piece 200 (see FIGS. 2, 3).

On the rim 101 are circumferentially arrayed and attached a number of groove cutting member 121, which are configured to gradually remove material from the work piece 200 while keeping friction in the cutting groove to a minimum and while preventing sudden biting of a cutting edge 122 in the cutting groove. For that purpose, the cutting members 121 have a sliding feature 123 placed in front of the cutting edge 122 with respect to an operational rotation direction of the apparatus 100.

There are preferably three groove cutting members 121 arrayed on the ring 101 to assure equally distributed contact pressure between the individual cutting members 121 and the work piece 200. The cutting members 121 are preferably attached in a removable fashion in recesses or cavities 109 of the rim 101 and radially fixed via cap screws 124. Hence, when the cutting members 121 suffer damage or wear, they may be quickly replaced. The invention includes embodiments in which the cutting members 121 are integral part of the ring 101, which in turn may be replaceable as a whole.

Figure 2:
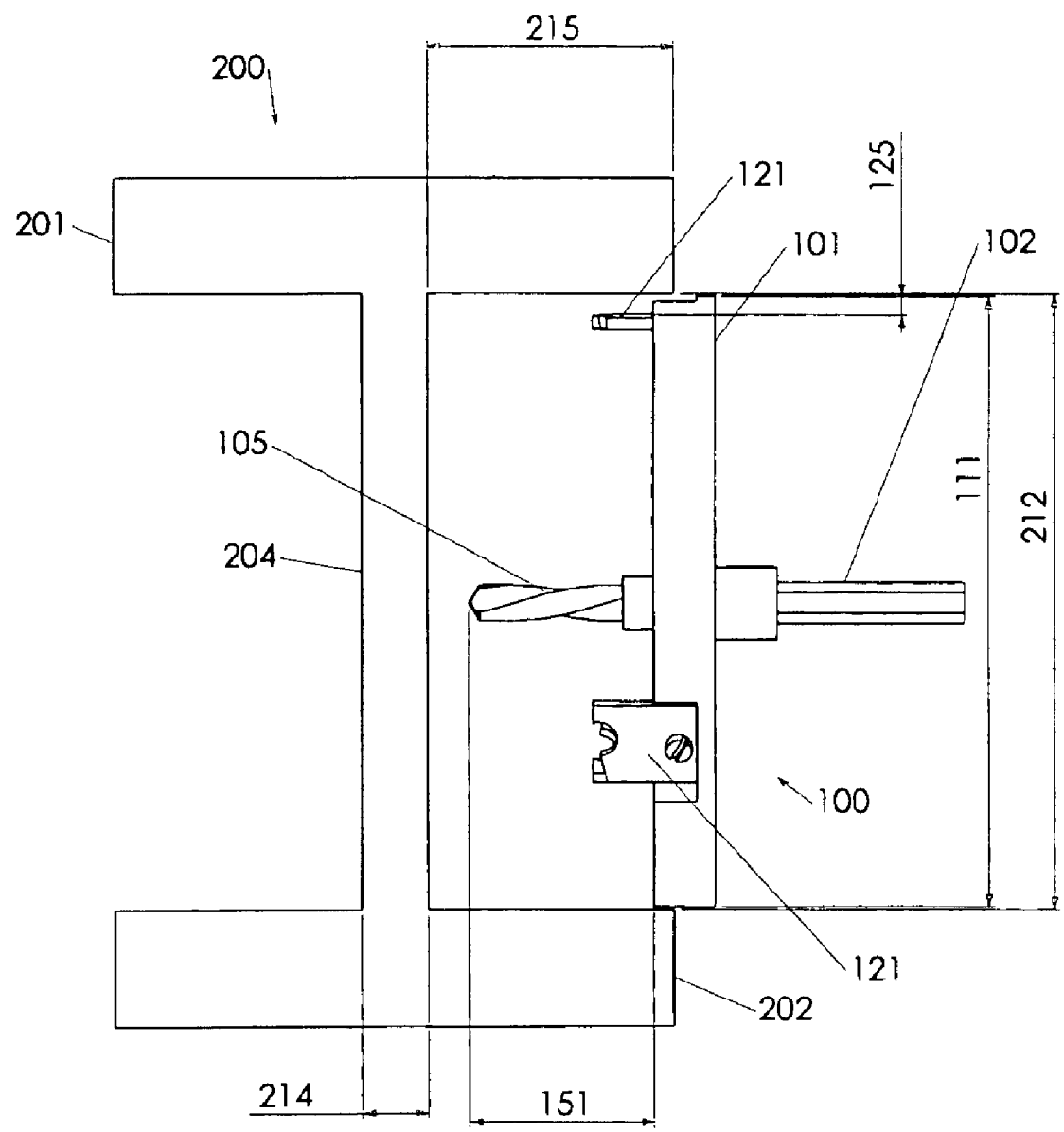
FIG. 2 illustrates a side view of the apparatus of FIG. 1 in operational approach to a preferred work piece.

Now turning to FIG. 2, the preferred operation of the apparatus 100 may be explained in more detail. The apparatus 100 is preferably configured for cutting holes 205 (see FIG. 3) in a web 204 of an I-beam 200 made of wood and/or wood like material. The I-beam 200, also known as I-joist 200 has a top chord 201 and a bottom chord 202. Both chords 201, 202 are spaced apart with distance 212, which equals the free height of the web 204. The rim 101 has an outer diameter or circular circumference 111 that is marginally smaller than distance 212. Consequently, the apparatus becomes vertically substantially aligned once the rim 101 is moved in between the chords 201, 202. The circular circumference 111 is sufficiently small to prevent excessive friction between the rotating rim 101 and a chord 201 and/or 202.

The pilot drill 105 protrudes above the rim 101 with an extension 151, which is sufficiently small to assure positioning prior to contacting of the pilot drill 105 with the web 204. During operation, the apparatus 100 is brought into rotation via the arbor 102 and brought into contact with the web 204 at a predetermined location. Since the rim 101 assures vertical alignment, the operating person may focus mainly on contacting the pilot drill 105 at a proper longitudinal position along the I-joist 200.

The drill extension 151 is selected such that the pilot drill 105 drills a sufficiently deep guiding hole into the web 204, before the cutting members 121 begin gradually removing material and thereby forming an increasingly deep concentric cutting groove. Due to the short circumferential length of the cutting members 121, chip buildup and associated friction between the cutting members 121 and the cutting groove is kept to a minimum.

While axial pressure is applied via the arbor 102, the cutting members 121 continue to gradually remove material from the cutting groove until a central portion of the web 204 inside the cutting groove becomes disconnected from the remainder of the web 204. The cutting members 121 have a height selected in correspondence with a thickness 214 of the web 204 to assure a cutting groove sufficiently deep for separating the central web portion.

The cutting members 121 are positioned in a substantially equal offset 125 to the rim's 101 circular circumference 111. The offset 125 is selected according to hole cutting standards established by a manufacturer of I-joist 200. The I-joist 200 may be fabricated in a number of standardized dimensions including a variety of standardized widths 212. The apparatus 100 may be provided in varying configurations that comply with the varying I-joist standards. As a result, the apparatus 100 may be selected in a prefabricated configuration that corresponds to the dimensional standard of the I-joist 200 for cutting a hole 205 (see FIG. 3) that is within the static safety limits for that particular I-joist 200.

To further reduce friction between the ring 101 and a chord 201 and/or 202, the outer surface of the ring 101 may be specially treated for reduced friction. Such treatment may include a coating with a low friction material such as Teflon.

The present invention includes embodiments in which a bushing ring or a bearing may be assembled on the rim 101. In that case, the circular circumference 111 would be that of the bushing or the bearing.

The present invention is not limited to cutting holes into wooden and/or wood like I-beams. It may also be configured for cutting holes with reduced friction into any kind of work piece. For example, holes may be cut with the apparatus 100 into a metal or stone. In such cases, the cutting members 121 may be accordingly configured for cutting metal or stone as is well known in the art.

Figure 3:
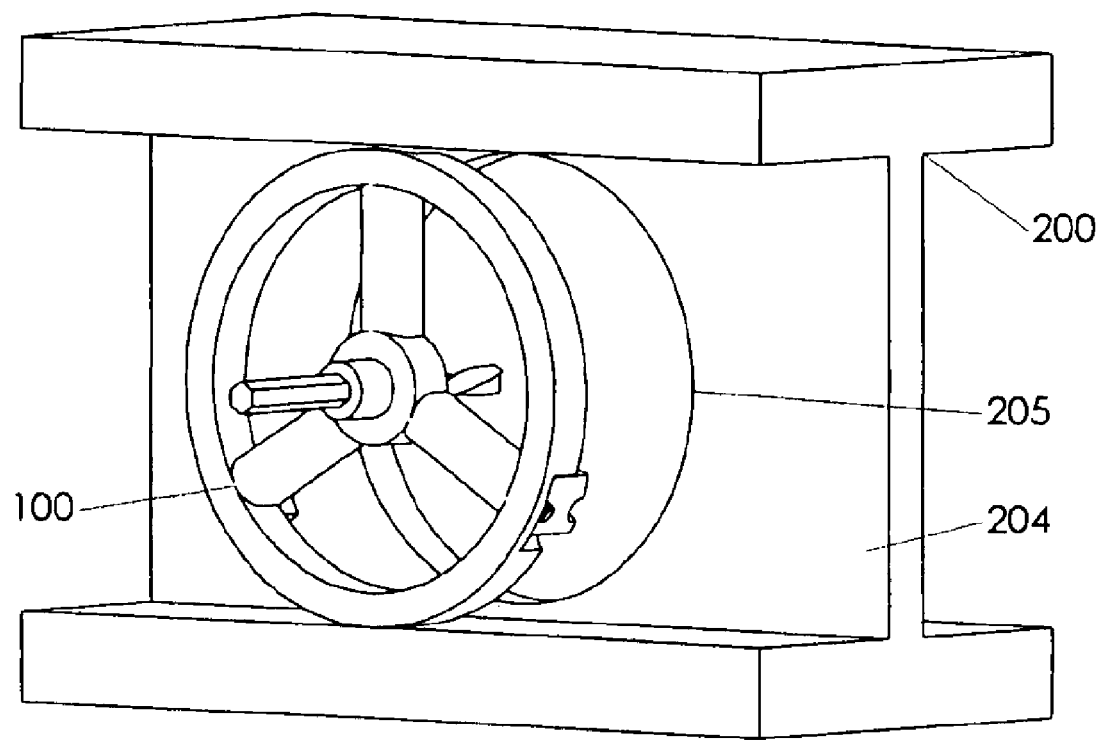
FIG. 3 depicts a perspective view of the apparatus of FIG. 1 and the work piece of FIG. 2 after cutting a hole with the apparatus into the work piece.

In the first embodiment of the invention depicted in the FIGS. 1–3, the circular circumference 111 is substantially continuous, which warrants a smooth sliding of the rim 101 against adjacent chords 201, 202 during cutting operation. In context with the present invention, the substantially continuous circular circumference 111 pertains to the fact that a projection of the circular circumference 111 in axial direction renders a substantial continuous circle, despite recessing cavities 109.

Figure 4:
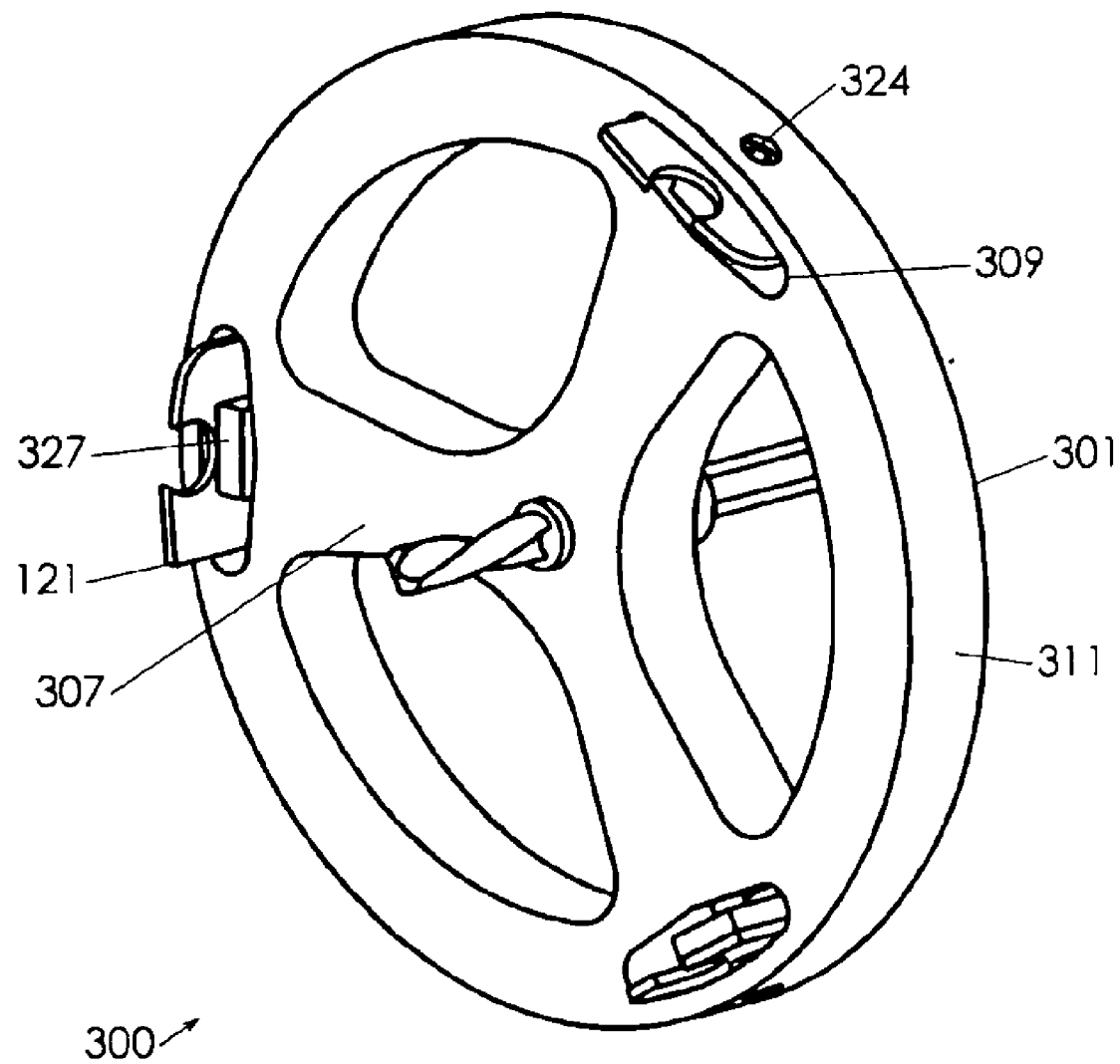
FIG. 4 shows a perspective view of a second embodiment of the invention.
Figure 5:
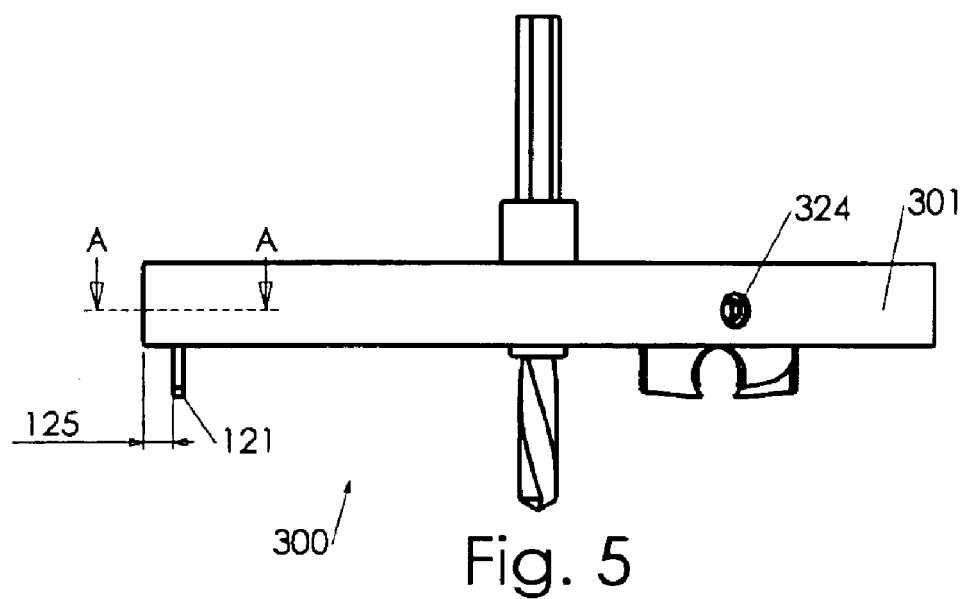
FIG. 5 is a top view of the apparatus of FIG. 4.
Figure 6:
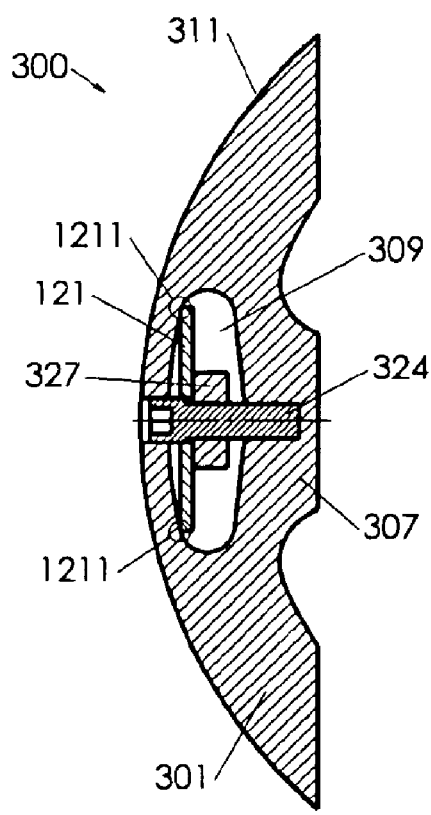
FIG. 6 is a detailed section view of the apparatus of FIG. 4 in accordance with a section line A—A indicated in FIG. 5.

In a second embodiment of the invention depicted in the FIGS. 4–6, the circular circumference 311 has s substantially continuous surface, which means that all main outside boundary edges of the continuous surface are substantially circular and substantially concentric. Cap screws 324 may be accessible through radial rim openings that are not considered as outside boundary edges due to their insignificantly small diameters. The substantially continuous surface provides increased operational safety preventing inadvertent radial thump in case of premature rotation of the apparatus prior to operational positioning of the apparatus 300.

An additional safety aspect is the fact that the groove cutting members 121 are fixedly held in cavities 309 that are finite in other than axial direction. Particularly, the cavities 309 are finite in direction radial away from the axis of rotation. Under extreme conditions, where the attachment of the groove cutting members 121 may suffer from impact or the like, the groove cutting members 121 would be held in the apparatus 300 against centrifugal forces.

FIG. 6 illustrates in detail how the groove cutting members 121 are fixedly held in the apparatus 300 via the cap screw 324 radially withholding itself in a press contact in one of the spokes 307 while pressing the groove cutting member 121 against an outside radial wall of the cavity 309. The cap screw 324 is reaching thereby through an opening of the groove cutting member 121 such that the cap screw 324 head is peripherally accessible through the radial rim opening. The cap screws 324 act thereby additionally as a double supported latch holding with their shaft and head their respective groove cutting members 121 in the cavity 309.

In contrast the groove cutting members 121 are pressed in the first embodiment against an inside radial wall of the cavity 109. Also, the cap screws 124 are withholding themself in a tensile fashion, which may require a threads in the spokes 107.

The cap screws 324 are preferably pressing there associated groove cutting members 121 via a nut 327 that has a circumferential locking contour corresponding to a rotation lock feature of the cavity 309. The circumferential locking contour is preferably a flat surface corresponding to a flat bottom of cavity 309 in assembled position. In that case, a flat bottom of the cavity 309 may serve as the circumferential locking contour.

Also in the second embodiment, the groove cutting members 121 may be pressed against the outside radial wall with two bridge contacts 1211 that are in an opposing distance relative to the cap screw 324 such that the groove cutting members 121 are resiliently deflected. This assists in establishing a resilient fix of the groove cutting members 121 that absorbs operational vibrations without becoming loose. Curvature of the groove cutting members 121 may be fabricated accordingly such that it may correspond to the cut groove radius in assembled position.

Rims 101, 301, spokes 107, 307 and central portions 103, 303 are preferably monolithically fabricated from a lightweight material such as for example, an aluminum alloy, an magnesium alloy, an injection molded plastic or from sheet metal.

The hole cutting apparatus 100, 300 may be fabricated in accordance with exemplary standard diameters for circular circumference 111, 311 listed in inches in the table below.

| |
|---|
| 4.5 |
| 5 |
| 5.5 |
| 6 |
| 6.5 |
| 7 |
| 7.5 |
| 8 |
| 8.5 |
| 9 |
| 9.5 |
| 10 |
| 10.5 |
| 11 |
| 11.5 |
| 12 |
| 12.5 |
| 13.0 |

The preferred offset 125 is about 0.25 inches making the cut holes in diameter approximately 0.5 inches smaller than the circular circumference 111, 311. An additional spacer insert may be placed in between the groove cutting member 121 and the respective outside wall to slightly reduce the diameter of the cut hole. Such spacer insert would have a preferred thickness of about 0.125 inches.

Accordingly, the scope of the invention described in the specification above is set forth by the following claims and their legal equivalents:

What is claimed is:

1. A hole cutting apparatus comprising:
    a. a central portion axially holding an arbor and a pilot drill;
    b. a rim having a substantially continuously circular circumference;
    c. at least three spokes connecting said central portion with said rim;
    d. groove cutting members circumferentially arrayed in a number equal to that of said spokes; and wherein said groove cutting members are fixed at said rim at positions immediately adjacent said spokes and wherein said groove cutting members are circumferentially oriented in a substantially equal radial distance to said pilot drill and wherein said groove cutting members are arrayed in a substantially equal offset to said circular circumference.

2. The hole cutting apparatus of claim 1, wherein said central portion, said spokes and said rim are monolithically fabricated.

3. The hole cutting apparatus of claim 1, wherein said central portion, said spokes, said rim and said cutting members are monolithically fabricated.

4. The hole cutting apparatus of claim 1, wherein at least one of said groove cutting members features a sliding feature in front of a cutting feature with respect to a cutting direction of said groove cutting members.

5. The hole cutting apparatus of claim 1, wherein at least one of said groove cutting members is fixedly held in a cavity of said rim.

6. The hole cutting apparatus of claim 5, wherein at least one of said groove cutting members is fixedly held in said cavity via a cap screw radially and tensile withholding itself at said spoke while pressing said at least one groove cutting member against an inside radial wall of said cavity, wherein said cap screw is reaching through an opening of said at least one groove cutting member.

7. The hole cutting apparatus of claim 5, wherein said cavity is finite in other than axial direction.

8. The hole cutting apparatus of claim 7, wherein at least one of said groove cutting members is fixedly held in said cavity via a cap screw radially withholding itself in a press contact at said spoke while pressing said at least one groove cutting member against an outside radial wall of said cavity, wherein said cap screw is reaching through an opening of said at least one groove cutting member, and wherein a head of said cap screw is peripherally accessible through a radial rim opening.

9. The hole cutting apparatus of claim 8, wherein said cap screw is pressing said at least one groove cutting member via a nut having a circumferential locking contour corresponding to a rotation lock feature of said cavity.

10. The hole cutting apparatus of claim 8, wherein said at least one groove cutting member is pressed against said outside radial wall with two bridge contacts being in opposing distance relative to said cap screw such that said at least one groove cutting member is resiliently deflected.

11. The hole cutting apparatus of claim 5, wherein said circular circumference has a substantially continuous surface.

12. The hole cutting apparatus of claim 1, wherein said circular circumference has a low friction coating.

* * * * *